US012762460B2

(12) United States Patent
Ma et al.

(10) Patent No.: US 12,762,460 B2
(45) Date of Patent: Oct. 13, 2026

(54) METHOD AND SERVER FOR DELEGATED QUANTUM COMPUTING USING A HARDWARE ENCLAVE

(71) Applicants: VERIQLOUD, Montrouge (FR); Sorbonne Université, Paris (FR); Centre National de la Recherche Scientifique, Paris (FR)

(72) Inventors: Yao Ma, Bourg-la-reine (FR); Marc Kaplan, Montrouge (FR)

(73) Assignees: VERIQLOUD, Montrouge (FR); Sorbonne Université, Paris (FR); Centre National de la Recherche Scientifique, Paris (FR)

( * ) Notice: Subject to any disclaimer, the term of this patent is extended or adjusted under 35 U.S.C. 154(b) by 732 days.

(21) Appl. No.: 18/253,205

(22) PCT Filed: Nov. 18, 2021

(86) PCT No.: PCT/EP2021/082062
§ 371 (c)(1),
(2) Date: May 16, 2023

(87) PCT Pub. No.: WO2022/106503
PCT Pub. Date: May 27, 2022

(65) Prior Publication Data

US 2024/0054383 A1 Feb. 15, 2024

(30) Foreign Application Priority Data

Nov. 18, 2020 (EP) .................................... 20306398

(51) Int. Cl.
*G06N 10/80* (2022.01)
*G06N 10/20* (2022.01)

(52) U.S. Cl.
CPC ............. *G06N 10/80* (2022.01); *G06N 10/20* (2022.01)

(58) Field of Classification Search
CPC .... G06N 10/80; G06N 10/20; H04L 2209/76; H04L 9/0858; H04L 9/0877; G09C 1/00
See application file for complete search history.

(56) References Cited

U.S. PATENT DOCUMENTS 7,518,120 B2 * 4/2009 Monroe ................. B82Y 10/00 398/183
8,386,899 B2 * 2/2013 Goto ...................... B82Y 10/00 712/1

(Continued)

FOREIGN PATENT DOCUMENTS

WO 2022106503 A1 5/2022

OTHER PUBLICATIONS

Broadbent, et al., "Universal Blind Quantum Computation", arXiv:0807.4154v3, Dec. 12, 2009, 20 pages.
Schwarz, et al., "Malware Guard Extension:Using SGX to Conceal Cache Attacks (Extended Version)", arXiv:1702.08719v3, May 22, 2019, 17 pages.
https://en.wikipedia.org/wiki/Qubit.

(Continued)

*Primary Examiner* — Ryan Barrett
(74) *Attorney, Agent, or Firm* — Conley Rose, P.C.

(57) ABSTRACT

The invention relates, in particular, to a quantum-enabled server (S) comprising an enclave (SE), a qubit source (SS), and quantum-computing means (SM), this enclave comprising means for: receiving information from a remote client through a secured communication channel; determining transformation data from said information; transforming at least one qubit received from said qubit source, according to transformation data; providing the at least one transformed qubits to said quantum-computing means.

10 Claims, 1 Drawing Sheet

(56) References Cited

U.S. PATENT DOCUMENTS

| | | | | |
|---|---|---|---|---|
| 8,897,449 | B1 * | 11/2014 | Broadbent | H04L 9/0891 380/278 |
| 10,826,845 | B2 * | 11/2020 | Dadashikelayeh | G06F 16/245 |
| 2015/0163178 | A1 * | 6/2015 | Jeon | H04L 67/55 709/206 |
| 2017/0093943 | A1 * | 3/2017 | Alsina | G06F 16/685 |
| 2018/0365585 | A1 * | 12/2018 | Smith | G06F 9/546 |
| 2018/0367309 | A1 * | 12/2018 | Reinhold | H04L 9/0662 |
| 2018/0375644 | A1 | 12/2018 | Karagiannis et al. | |
| 2019/0042264 | A1 * | 2/2019 | Zou | G06F 9/30 |
| 2019/0179730 | A1 * | 6/2019 | Geller | G06F 11/3698 |
| 2020/0327441 | A1 * | 10/2020 | Cao | G06N 10/20 |
| 2021/0081545 | A1 * | 3/2021 | Mulligan | G06F 9/45558 |
| 2021/0112130 | A1 * | 4/2021 | LeClair | G06F 16/957 |
| 2021/0390439 | A1 * | 12/2021 | Ramasamy | G06N 10/60 |
| 2023/0020193 | A1 * | 1/2023 | Williams | H04L 9/0825 |
| 2023/0162076 | A1 * | 5/2023 | Kaplan | G06N 10/20 706/62 |
| 2024/0160992 | A1 * | 5/2024 | Kaplan | G06N 10/20 |

OTHER PUBLICATIONS https://en.wikipedia.org/wiki/Software_Guard_Extensions.

https://en.wikipedia.org/wiki/Trusted_execution_environment.

Foreign Communication from a Related Counterpart Application, International Search Report and Written Opinion dated Feb. 25, 2022, International Application No. PCT/EP2021/082062 filed on Nov. 18, 2021.

Dunjko, et al., "Blind quantum computing with two almost identical states", arxiv.org, Cornell University Library, Ithaca, NY, Apr. 6, 2016, XP080693677, 38 pages.

Fitzsimons, et al., "Unconditionally verifiable blind quantum computation", Physical Review A, vol. 96, No. 1, Sep. 29, 2015, 46 pages, XP055798721, ISSN: 2469-9926, DOI: 10.1103/PhysRevA.96.012303.

Childs, "Secure assisted quantum computation", Quantum Information and Computation, 5.6, 11 pages, ISSN15337146, arXiv: quant-ph/0111046.

* cited by examiner

METHOD AND SERVER FOR DELEGATED QUANTUM COMPUTING USING A HARDWARE ENCLAVE

CROSS-REFERENCE TO RELATED APPLICATIONS

The present application is a filing under 35 U.S.C. 371 as the National Stage of International Application No. PCT/EP2021/082062, filed Nov. 18, 2021, entitled "METHOD AND SERVER FOR DELEGATED QUANTUM COMPUTING USING A HARDWARE ENCLAVE," which claims priority to European Application No. 20306398.7 filed with the Europe Patent Office on Nov. 18, 2020, both of which are incorporated herein by reference in their entirety for all purposes.

TECHNICAL FIELD

The invention relates to delegated quantum computing. In particular, it allows blind delegation to a quantum-enabled server over a secured communication channel, so that the server cannot learn some information received from the clients.

BACKGROUND

Quantum computers are still difficult to develop and costly pieces of equipment. It is therefore highly probable that quantum computers will only be accessible over communication networks to remote clients, as are supercomputers today. They will provide computing services according to a client/server scheme, wherein the clients send requests and receives results from the server.

Delegated Quantum Computation (DQC) allows a client with limited quantum power to delegate a computation to a quantum-enabled server, in order to obtain the outcome of a computation. Generally speaking, the scenarios of delegated quantum computation involve three main stages: preparation stage, computation stage and output correction stage.

A strong requirement for such scheme is the protection of the data provided by the client to the server. A main question asks whether the client can securely delegate a quantum computation to an untrusted server. In particular, a blindness characteristic shall be ensured, i.e. the fact that the computations and the data of the client remain secret, even from the server itself.

Different proposals have been made regarding a Blind Delegated Quantum Computation.

The concept was first introduced in Andrew M. Childs, "Secure assisted quantum computation" in *Quantum Information and Computation,* 5.6, ISSN15337146, arXiv: quant-ph/0111046, and, further developed, in particular, in Anne Broadbent, Joseph Fitzsimons and Elham Kashfi, "Universal Blind Quantum Computation" in 2009 50$^{th}$ *Annual IEEE Symposium on Foundations of Computer Science*, October 2009, pp. 517-526, arXiv: 0807.4154

These schemes assume a quantum communication link between clients and the server. They therefore require the clients to be quantum-enabled and thus embed the needed, and costly, quantum equipments.

They might also require a conversion from systems used by the client for communicating to systems used by the server for computation, raising further technological issues.

First attempts have been proposed to have a classical, or legacy, client, i.e. not embedding any quantum features, exchanging with the server through a classical non-quantum communication link. For instance, Vedran Dunjko and Elham Kashefi, "Blind Quantum Computing with two almost identifiable states" in arXiv: 1604.01586, addresses the question of "whether a fully classical Alice can securely delegate a quantum computation to an untrusted server Bob. The main two flavours of security one is interested in are blindness—meaning Alice's computation remains private and hidden from Bob—and verifiability—meaning Alice has a mechanism which ensures the declared output of the computation is indeed correct."

However, as of today, the work proposing blind quantum computing with remote classical clients induce large overhead in the computation.

SUMMARY

In particular, according to embodiments, a method and a server are proposed based on the use of a hardware enclave, enabling classical communication with a classical client, and the blindness characteristics, including with regard to the server itself.

In a first example embodiment, a quantum-enabled server is provided. It comprises an enclave, a qubit source, and quantum-computing means, said enclave comprising means for:

- receiving information from a remote client through a secured communication channel;
- determining transformation data from said information;
- transforming at least one qubit received from said qubit source, according to transformation data;
- providing the at least one transformed qubits to said quantum-computing means.

This server may comprise other features, alone or in combination, such as:

- said transformation data are contained in said information and adapted to transform said at least one qubit;
- said information represents application code configured for being executing within said enclave and for generating said transformation data.
- said transformation data are modulation data, and said enclave comprises means for modulating at least one qubit received from said qubit source, according to modulation data
- said enclave comprises
  - a classical secured enclave comprising a trusted execution environment, a memory comprising an operating system and adapted to host an application code, and configured to generate said transformation data as digital transformation data;
  - a digital-to-analog converter for converting said digital transformation data into analog digital data;
  - transforming means for transforming a degree of freedom of said at least one qubit according to analog transformation data;
- the digital-to-analog convertor is encapsulated into a cage preventing any electromagnetic signals been read from outside of said enclave;
- said information is ciphered and deciphered at said enclave at receipt;
- said enclave sends an attestation back to said client to if said Trusted Execution Environment successfully runs said classical enclave;
- said enclave is configured to:
  - determine test qubits among said at least one qubit;
  - transform said test qubits according to an unknown transformation;

instruct said quantum-computing means to measure the transformed test qubits according to a given base;

verify if the result of the measurements is compatible with said unknown transformation; and trigger an error if a number of failed verification is above a given threshold;

The quantum-enabled server is configured to retrieve a public key from said information, encrypt said transformation data with said public key, and transmit the encrypted transformation data to said client.

In a second example embodiment, a method is provided, for delegating quantum computing to a quantum-enabled server, comprising:

sending information from a remote client to an enclave inside said quantum-enabled server through a secured communication channel;

determining, at said enclave, transformation data from said information;

transforming, at said enclave, at least one qubit received from said qubit source, according to said transformation data;

providing the at least one transformed qubits to said quantum-computing means.

BRIEF DESCRIPTION OF THE FIGURES

Some embodiments are now described, by way of example only, and with reference to the accompanying drawings, in which:

The FIG. 1 schematically illustrates a system comprising a quantum-enabled server, a client and a communication channel, according to embodiments of the invention.

Figure 2:
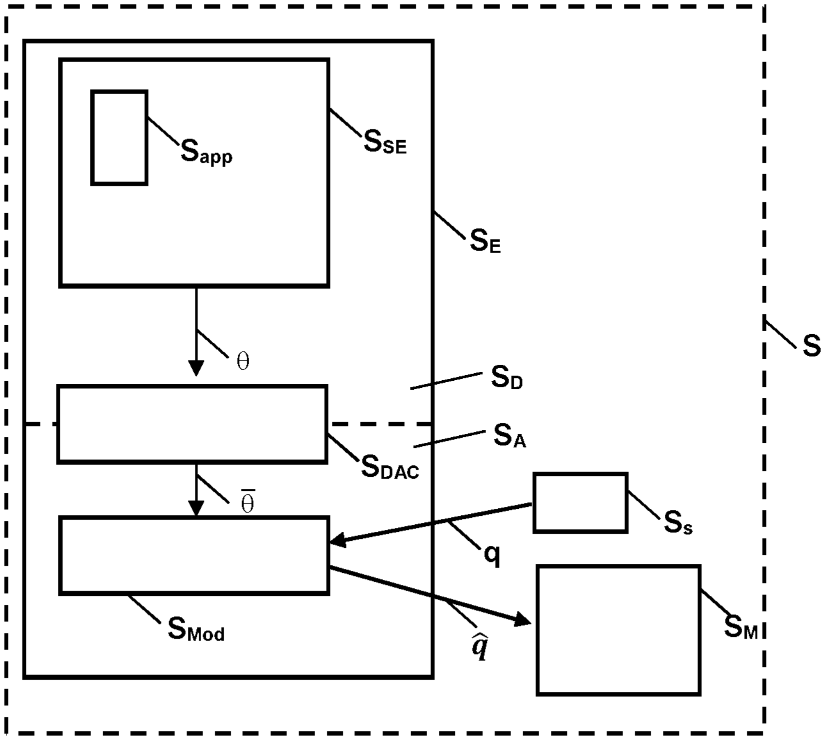

The FIG. 2 schematically illustrates a functional architecture of quantum-enabled server according to embodiments of the invention.

DESCRIPTION OF EMBODIMENTS

In the following, the terms "classical" and "legacy" refer, interchangeably, to any communication means or computing means that is not quantum-enabled.

Figure 1:
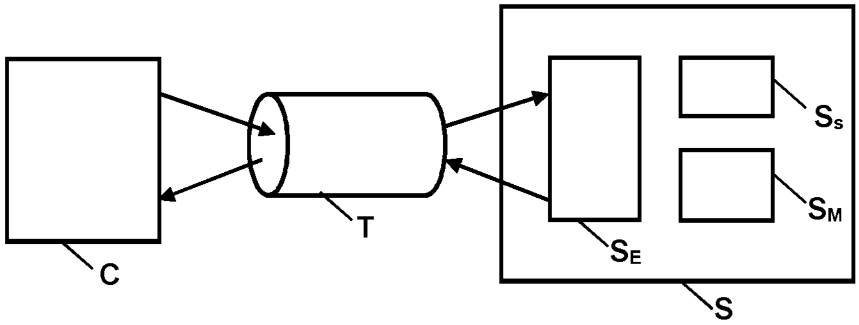

In reference to FIG. 1, a quantum-enabled server S and a client C can communicate through a communication channel T.

The quantum-enabled server S comprises apparatus able to operate on quantum.

Quantum computation implies the manipulation of data in form of quantum bits or "qubits". Whereas in classical computation a bit of information is used to represent only one of two possible logical states, namely "1" or "0", in quantum computation, a qubit can represent both logical states simultaneously as a superposition of quantum states.

In practice, qubits can be coded by using degrees of freedom of different physical particles. Degrees of freedom are a physical property of physical systems, which can be described by quantum mechanics.

In particular, qubits can be physically implemented by various supports including photons, coherent state of light, electrons, nucleus, optical lattices, Josephson junctions for superconducting qubits, etc. A non-exhaustive list may be found, for instance, on Wikipedia: https://en.wikipedia.org/wiki/Qubit Accordingly, degrees of freedom depend on the physical support and comprise phase, phase differences, frequency, polarization, time localization of photons. Also, spins of electrons, superconducting charge, electron number, etc. can also be used.

Qubits can be written as a vector in a Hilbert vector space of dimension d.

In a dimension d=2, the qubit can be defined by a basis consisting of two states, which are denoted |0> and |1>. Thus, the state |α> of the qubit can be represented as:

$$|\alpha\rangle = a|0\rangle + b|1\rangle$$

where a and b are complex number coefficients.

The qubit can store information as a combination of 0 and 1, using different values of a and b. However, a measurement of the qubit will cause it to project onto |0> or |1> state and return the result 0 or 1 respectively. The probabilities of returning these values are $|a|^2$ and $|b|^2$ respectively A quantum-enabled apparatus comprises means to operate on the qubits. Such apparatuses comprise sources of qubits, receivers, and any other devices able to operate qubits, e.g. to transform their states.

The quantum-enabled server S comprises such apparatus and in particular a quantum source $S_S$, transformation means $S_{mod}$ and further quantum-computing means $S_M$. These quantum-enabled apparatuses shall be adapted to operate on a same quantum technology.

According to embodiments of the invention, the client is a classical client, meaning it is a computing device having no quantum-enabled mean. It can be a legacy computer or any other platform or device comprising classical communication means.

Accordingly, the communication channel can also be a legacy communication channel. This comprises local communication network, when the client C and the server S are located in a close vicinity, like Ethernet links, Wi-Fi, Bluetooth, etc. This also comprises wide-area networks, like in particular the Internet, and any mixes of communication networks of different technologies.

FIG. 1 shows an example wherein only one client is depicted. However, embodiments of the invention apply as well in situations where a plurality of clients can communicate with a server S. In the following, one assumes that interactions between each client and the server can be performed in an independent way, so that only interactions between one client and a server will be described without any loss of generality.

FIG. 2 depicts with more details a functional architecture of embodiments of such a quantum-enabled server S.

According to embodiments, the quantum-enabled server S comprises an enclave $S_E$ that comprises itself means for receiving information from the client C through the communication channel T.

According to embodiments, the communication channel T is a secured channel. Security can be ensured by cryptographic mechanisms, wherein transmitted information is cyphered at client's side before transmission and deciphered at enclave's side at receipt. This allows that the communication between the client and the enclave are private and secured, even from the server S itself (i.e. outside of the enclave).

Various security schemes known in the art can be used, including RSA, DSA (Digital Signature Algorithm), AES (Advanced Encryption Standard).

Still another scheme can NTRU. The NTRUEncrypt public key cryptosystem, also known as the NTRU encryption algorithm, is a lattice-based alternative to RSA and ECC (Elliptic-Curve Cryptography) and is based on the shortest vector problem in a lattice, which is not known to be breakable using quantum computers.

According to embodiments, instead of generating a secret at its side, the client instructs the server S to generate a random key. Embodiments of this process will be explained later. In particular, the client can transmit to the enclave $S_E$ of the server an executable code enabling the generation of a random key inside the enclave. Then, this key can be encrypted and sent back to the channel through the authenticated communication channel T.

According to embodiments, then, only the transmission from the enclave to the client may be encrypted. This may be sufficient for universal blind quantum computation. A property of this embodiment is to prevent malicious server from potentially reverse compiling the secret in the first place.

Furthermore, the server S further comprises a qubit source $S_S$ and quantum-computing means $S_M$. Other components may (not depicted on FIG. 2) can be further embedded inside the server S.

In consequence, globally, the quantum-enabled server of the invention has a hybrid nature, since it embeds both means for quantum operations and means for classical operations.

The enclave $S_E$ enables the quantum-enabled server S to perform classical operations in collaboration with the client C, in a secured way. By "secured", it is meant that no party apart the client C and the components inside the enclave $S_E$ can access the content of the data.

For doing so, both physical or logical isolation of the storage, computing and communication means can be enforced, in particular with regard to other components of the server S. Also, encryption mechanisms can be put in place, so that any malicious attempts to access data will result in getting an enciphered form, preserving the privacy of the real data.

In other words, the enclave $S_E$ can be functionally defined as a group of elements of the server, including components and information (code, data) that are isolated from the other elements of the server for preserving their privacy (i.e. so that none of the latter can access to their content).

According to embodiments, the enclave $S_E$ comprises a classical subpart, comprising a classical enclave $S_{SE}$, and quantum part dealing with quantum operations and comprising transformation means $S_{Mod}$ configured to transform at least one qubit received from a qubit source according to transformation data. The enclave $S_E$ can thus be called "quantum enclave", or "Q enclave", after its quantum characteristics.

A digital-to-analog converter $S_{DAC}$ forms sort of a junction between the two subparts and belongs to both to the digital realm, northbound, and to the analog realm, southbound.

The classical enclave $S_{SE}$ can be an enclave, also known as "secure enclave", according to techniques known in the art, e.g. running on a Trusted Execution Environment, TEE.

As the enclave $S_E$, it corresponds to a technique for creating and maintaining a secured, protected, or isolated partition or environment. It is a set of information and processing capabilities that are protected as a group.

The classical enclave $S_{SE}$ runs a dedicated microkernel and undergoes a secure boot process separate from the rest of the server S. It may thus be designed to be secured even if the server S is hacked and/or host malicious applications or Operating System (OS) components.

Several implementations of such enclaves have already been proposed.

Apple proposes for its iPhones an enclave based on dedicated hardware components including a coprocessor.

Intel proposes an enclave called "Software Guard eXtension" (SGX) that is embedded inside the Intel microprocessor itself. This mechanism allows user-level as well as operating system code to define private regions of memory, called enclaves, whose contents are protected and unable to be either read or saved by any process outside the enclave itself, including processes running at higher privilege levels. SGX involves encryption by the CPU of a portion of memory. The enclave is decrypted on the fly only within the CPU itself, and even then, only for code and data running from within the enclave itself. The processor thus protects the code from being "spied on" or examined by other code. The code and data in the enclave utilize a threat model in which the enclave is trusted but no process outside it can be trusted (including the operating system itself and any hypervisor), and therefore all of these are treated as potentially hostile. The enclave contents are unable to be read by any code outside the enclave, other than in its encrypted form.

Documentations about Intel's SGX are available on the Intel website, and also on Wikipedia:
https://en.wikipedia.org/wiki/Software Guard Extensions Some academic literature has been published as well, like e.g. Schwarz, Michael; Weiser, Samuel; Gruss, Daniel; Maurice, Clémentine; Mangard, Stefan (2017). "Malware Guard Extension: Using SGX to Conceal Cache Attacks". arXiv: 1702.08719

According to embodiments, the server S is based on a Linux platform. The Intel's SGX enclave is available for Linux-based server, as for instance documented in "Intel® Software Guard Extensions SDK for Linux OS".

According to embodiments, the classical enclave $S_{SE}$ runs on a specific secured area in the main processor called a Trusted Execution Environment, TEE, which guarantees the integrity and the confidentiality of the code and of the data of a running application inside the classical enclave $S_{SE}$.

The Trusted Execution Environment, TEE, has been first defined by the Open Mobile Terminal Platform (OMTP) standards, in "OMTP Hardware Requirements And Defragmentation", gsma.org. It is also documented on Wikipedia, at https://en.wikipedia.org/wiki/Trusted execution environment The CPU with the micro-architecture of the TEE integrates a set of instructions that allows user-level applications, as well as OS (Operating System) level code to define private region of memory.

The classical enclave $S_{SE}$ provides thus hardware resources (based on a TEE), OS resources (running on the TEE), as well as a secured memory able to store an application $S_{app}$ and related data.

The application $S_{app}$ is configured to control transformation means $S_{mod}$ embedded in the enclave $S_E$.

The application may be natively stored and installed in the memory of the classical enclave. In variants, several applications may be installed, for instance, at startup of the classical enclave. The information received from the client C may then contain an identifier of the particular application $S_{app}$ to trigger.

According to other embodiments, the information received from the client C represents the application code of the application $S_{app}$.

The code may be transmitted over the communication channel as binary code. The binary code shall be adapted for being directly executed by the OS and hardware of the classical enclave $S_{SE}$. The latter can then start the execution of the provided application $S_{app}$, for instance at receipt.

The information transmitted by the client C may also comprise parameters influencing the behaviour of the application $S_{app}$. In particular, the parameters can be passed as parameters of the application considered as a software function.

According to another embodiments, the information received from the client C comprises directly transformation data. In this case the application $S_{app}$ may be configured to receive these transformation data and forward them, with some potential data formatting) to the digital-to-analog converter, $S_{DAC}$.

According to embodiments, the classical enclave $S_{SE}$ may be adapted to implement different approaches. In particular, it may contain an application for receiving and forwarding transformation data and may also receive application code(s) as previously described. This way, the client can control the transformation of qubits in several ways.

Accordingly, the invention allows the client C to remotely define the application $S_{app}$ which behaviour aims in transforming the qubits that will be provided to the quantum computing means of the server. Accordingly, the client can remotely control the transformation of the qubits provided to the server.

The application $S_{app}$ generates transformation data θ, when executed on the classical enclave $S_{SE}$. These transformation data, at this step, are digital transformation data.

The digital transformation data are provided to a digital-to-analog converter $S_{DAC}$. The digital-to-analog converter converts the received digital transformation data θ into analog transformation data $\overline{\theta}$.

Different types of digital-to-analog converters may be used in the context of the invention. In particular, FPGA (Field Programmable Gate Arrays) DAC can be used.

According to embodiments, the digital-to-analog converter $S_{DAC}$ is encapsulated into a cage preventing any electromagnetic signals been read from outside of the enclave $S_E$. In particular, this prevent any malicious devices (oscilloscopes . . . ) to measure any transformation schemes of the analog transformation data $\overline{\theta}$ so as to decode the transformation data θ. The cage may be a continuous or meshed structure made of conductive materials like metal.

According to embodiments, the digital transformation data θ are also provided back to the client C, preferably in a secured way.

This security may be ensured by having first the client C determining a couple of associated private and public keys, and transmitting to the enclave this public key together with the application $S_{app}$. The application can then encrypt the digital transformation data with this public key, so that the client can decrypt them at receipt with its private key.

Furthermore, according to embodiments an attestation is provided to the client C if the trusted Execution Environment, TEE, successfully runs the classical enclave $S_{SE}$, e.g. the application $S_{app}$, as a proof of the integrity of the TEE and of the enclave running on the TEE.

According to the document Intel® Software Guard Extensions Developer Guide, "[a]n attestation is the process of demonstrating that a piece of software has been established on a platform. In case of Intel SGX, it is the mechanism by which a third party establishes that a software entity is running on an Intel SGX enabled platform protected within an enclave prior to provisioning that software with secrets and protected data."

The digital-to-analog converter $S_{DAC}$ constitutes a junction between the classical and digital subpart $S_D$ of the enclave $S_E$ and the quantum and analog subpart $S_A$ of the enclave (this junction being depicted as a dashed line on FIG. 2).

According to embodiments, the transformation performed by the transformation means is a modulation. Accordingly, the (digital and analog) transformation data are (respectively digital and analog) modulation data.

As different qubits can be coded by using degrees of freedom of different physical particles, different types of modulating means $S_{mod}$ can be used. In particular photonic modulator can be used to modulate one quantum parameter of the photons.

For instance, in an embodiment based on a photonic modulator, the modulator can act on phases, phase differences, frequencies, polarization, time localization, etc. of the incoming photos, provided by the quantum source.

However, many other implementing technologies are possible and the invention is independent of these technologies.

As depicted on FIGS. 1 and 2, a qubits source $S_S$ generates qubits q and transmits them to the transformation means $S_{mod}$ (for instance a modulator). The generated qubits can have fixed quantum states.

As explained earlier, the qubits generated by the qubit source $S_S$ may be supported by various physical particle, like photons, electrons, etc. The state of the qubit is implemented by a degree of freedom of the physical particle.

The transformation means then modulate a degree of freedom of the qubit q according to the analog transformation (e.g. modulation) data $\overline{\theta}$. The resulting qubits $\hat{q}$ can then be provided to the quantum computing means $S_M$ of the server, outside of the enclave $S_E$.

The quantum computing means $S_M$ can then use the transformed qubits for further computation, including transmission to another quantum-enable device. These aspects are let outside of the invention, which relates to the preparation of transformed qubits for the server S.

In particular, it may be possible that the quantum computing means $S_M$ provides some results to the enclave $S_E$. The enclave may in addition comprise some quantum-enabled input interfaces, and in particular some detector and an analog-to-digital converter (ADC) to get quantum states of quantum signals received from the quantum computing means $S_M$. Then these digital data can be encrypted and transmitted to the client C, for instance, or to another party. These arrangements, as well as other arrangements, are possible without departing from the scope of the invention.

In consequence, the quantum computing means of the server receives qubits but cannot learn anything of their quantum states, because of a secured separation of the quantum means and of the enclave $S_E$, which is aware of the transformation data A Remote State Preparation (RSP) scheme can thus be ensured, by moving the quantum part of the preparation stage totally from the client to the server. Accordingly, the client may be a classical client, i.e. without any quantum means.

This RSP scheme can then be used to ensure quantum computation with the required blindness property and verifiability Verifiability could be achieved while composing an alternative Delegated Quantum Computation (DQC) protocol which introduces trap qubits in UBQC scheme, as described in Joseph F. Fitzsimons and Elham Kashefi, "Unconditionally Verifiable Blind Quantum Computation" in *Physical Review A,* 96(1):012303, 2017.

Full blindness can be ensured by the embodiments of the invention, by the use of a chain of security mechanisms, i.e. cryptographic mechanisms between the client and the server, a classical enclave on the server, and secured means to provide analog transformation data to the transformation means, as described here-above.

In addition, according to embodiments, a further security mechanism is provided to ensure of the non-mischievous nature of the quantum source $S_S$ itself.

In particular, a mechanism is proposed to verify that the qubits prepared and received from the quantum source have a fixed quantum state.

A mechanism may consist in identifying some test qubits among a flow of qubits received from the qubit source. An unknown transformation can then be applied to these test qubits by the transformation means $S_{mod}$, which are then transmitted to the quantum computing means $S_M$ of the server.

Then, the enclave $S_E$ instructs the quantum computing means to measure these transformed test qubits according to a given base.

The quantum computation means transmit then the result of these measurements to the enclave $S_E$.

The enclave may then verify this result: if the result is compatible with the unknown transformation applied by the quantum transformation means $S_{mod}$, then the enclave knows that the quantum source provided a fixed quantum state. Otherwise, the enclave may trigger an error.

As some error may happen in the generation of the qubits, without any mischievous behaviour of the latter, a threshold may be set to trigger the triggering of an error only if the number of cases of incompatibility between the result of the measurement and the applied transformation (i.e. failed verification) is above this threshold.

According to embodiments, the server may a standalone apparatus, wherein the enclave, the qubit source and the quantum-computation means are provided. According to variants, the server may be a platform composed of several elements located in a vicinity but not necessary as a standalone apparatus. For instance, the server may be made of several boxes connected by the appropriate communication means.

EXAMPLE OF A RANDOM NUMBER GENERATOR

In order to illustrate various embodiments of the invention, an example is provided to generate a random number to be used for further treatment by the quantum computing means $S_M$ of the server. Thanks to the invention, a classical client (without any quantum-enabled means), like a legacy computer or even a smartphone, can trigger the generation of a random number at a quantum-enabled server.

A quantum random number generation can be defined to exploit the unpredictability of quantum mechanics as resource of randomness. According to embodiments, however, one can still use classical resource of randomness to encode random information, as described here-below.

The client C can initially design a RNG (Random Number Generation) application $S_{app}$ in binary code and seals a public key $p_k$ with it. The associated private key, $s_k$, is kept secret at client's side.

Then the RNG application is transmitted to the enclave $S_E$ of the server S through a secured communication channel T. Accordingly, classical encryption mechanisms can be put in place, as described here-above.

The enclave $S_E$ executes the RNG application in the Trusted Execution Environment, TEE, as a true enclave application. If so, the client C will receive an attestation which verifies the integrity of the TEE and of the enclave.

If no such an attestation can be transmitted to the client, the latter may then consider that the preparation phase cannot be accepted. Accordingly any results received from the server shall then be discarded, and depending on the case, other actions can be triggered, like raising an alert, etc.

Example of RNG application may be:

```
Procedure RNG(n, p_k)
    i ← 0
    θ[n] ← 0

    Z_{π/4} = {0, π/4, 2π/4, ... 7π/4}

    While i<n do

        θ[i] ← RZ_{π/4}

        i ← i+1
    End while
    S ← Enc_{p_k}((θ[n]))
```

The binary code corresponding to this pseudocode is transmitted to the enclave, together with the two parameters the number n of random number to generate and the public key $p_k$.

According to this code, as an illustrative example, a set $$\mathbb{Z}_{\frac{\pi}{4}}$$

is defined corresponding to rotation angles of a modulated quantum elements. Each rotation angle corresponds then to a value (or state) of the respective qubit.

$$R\mathbb{Z}_{\frac{\pi}{4}}$$

Then, for each i of the n qubits, a random rotation is determined and assigned to the respective qubit's value, θ[i]. These values correspond to the digital modulation data.

Once all qubits have been assigned a random value, these values can be encrypted with the received public key $p_k$ and sent back to the client C. (In the pseudocode, the function $Enc_{pk}$ corresponds to this process)

The client can then decrypt them by using its private key $s_k$ and learn the random numbers θ[i], 0<i<n.

Once the application $S_{app}$ has executed, the generated digital modulation data θ[i] are input to the digital-to-analog converted $S_{DAC}$ and the resulting analog modulation data are then provided to the modulating means $S_{mod}$.

The modulating means $S_{mod}$ receives a qubit prepared by the qubit source in a fixed state, for instance |+>.

By applying the modulation to the whole set of qubits, the resulting quantum state, outputted by the modulating means is:

$$|e\rangle = Z_1(\theta[1]) \otimes Z_2(\theta[2]) \ \ldots \ \otimes Z_{1n}(\theta[n])\,|I\rangle$$

with $$|I\rangle = |+\rangle^{\otimes n}$$

$Z(\theta)$ represents a rotation according to angle θ around the Z axis on the Bloch sphere from an initial state |+>, which originally lies on the x axis.

The quantum-computing means $S_M$ of the server S can then receive the qubits and can compose any further processing, including computing, transmission and measurements.

Also, according to embodiments, the random number generated by this RNG application can be used as a secret key for ciphering the communication from the enclave to the client, as explained above.

The invention claimed is:

1. A quantum-enabled server (S) comprising an enclave ($S_E$), a qubit source ($S_S$), and quantum-computing means ($S_M$), said enclave comprising means for receiving classical information from a remote client through a secured communication channel;

a classical secured enclave ($S_{SE}$) comprising a trusted execution environment, a memory comprising an operating system and adapted to host an application code, the classical secured enclave configured to process the classical information from a remote client through a secured communication channel, configured to execute said application for determining transformation data from said classical information;

wherein the classical information is selected from a group consisting of: application code configured for execution within the classical secured enclave, parameters for an application hosted within the classical secured enclave, an identifier for an application hosted within the classical secured enclave, and transformation data;

a digital-to-analog converter ($S_{DAC}$) for converting said transformation data into analog transformation data ($\bar{\theta}$); and transforming means ($S_{Mod}$) for transforming a degree of freedom of at least one qubit received from said qubit source, according to the analog transformation data to produce at least one transformed qubit and for providing the at least one transformed qubit to said quantum-computing means.

2. The quantum-enabled server according to claim 1, wherein said transformation data are contained in said information and adapted to transform said at least one qubit.

3. The quantum-enabled server according to claim 1, wherein said information represents application code configured for being executed within said enclave and for generating said transformation data.

4. The quantum-enabled server according to claim 1, wherein said transformation data are modulation data, and said enclave comprises means for modulating at least one qubit received from said qubit source, according to modulation data.

5. The quantum-enabled server according to claim 1, wherein the digital-to-analog convertor is encapsulated into a cage preventing any electromagnetic signals being read from outside of said enclave.

6. The quantum-enabled server according to claim 1, wherein said information is ciphered and deciphered at said enclave at receipt.

7. The quantum-enabled server according to claim 4, wherein said enclave sends an attestation back to said client if said Trusted Execution Environment successfully runs said application code inside of said classical secured enclave.

8. The quantum-enabled server according to claim 1, wherein said enclave is configured to:

determine test qubits among said at least one qubit;

transform said test qubits according to an unknown transformation;

instruct said quantum-computing means to measure the transformed test qubits according to a given base;

verify if the result of the measurements is compatible with said unknown transformation; and trigger an error if a number of failed verifications is above a given threshold.

9. The quantum-enabled server according to claim 1, configured to retrieve a public key from said information, encrypt said transformation data with said public key, and transmit the encrypted transformation data to said client.

10. A method for delegating quantum computing to a quantum-enabled server, comprising an enclave (SE), a qubit source (SS), and quantum-computing means (SM), said method comprising:

receiving classical information from a remote client by the enclave inside said quantum-enabled server through a secured communication channel, wherein the classical information is selected from a group consisting of: application code configured for execution within a classical secured enclave of said enclave, said classical secured enclave comprising a trusted execution environment, a memory comprising an operating system and adapted to host an application code, parameters for an application hosted within the classical secured enclave, an identifier for an application hosted within the classical secured enclave, and transformation data;

determining, by the classical secured enclave transformation data from said classical information by executing said application code;

converting, by a digital-to-analog converter of said enclave, said transformation data into analog transformation data;

transforming, by transformation means of said enclave, a degree of freedom of at least one qubit received from said qubit source, according to said analog transformation data to produce at least one transformed qubit; and providing the at least one transformed qubit to said quantum-computing means.

* * * * *